Jan. 24, 1939.  P. H. THORPE  2,144,746
APPARATUS FOR MEASURING DISTANCES AND
INDICATING ROUTES ON MAPS OR CHARTS
Filed Nov. 10, 1937  5 Sheets-Sheet 1

INVENTOR
PERCY. H. THORPE
PER Rayner Mo
ATTORNEYS

Jan. 24, 1939.　　　P. H. THORPE　　　2,144,746
APPARATUS FOR MEASURING DISTANCES AND
INDICATING ROUTES ON MAPS OR CHARTS
Filed Nov. 10, 1937　　　5 Sheets-Sheet 2
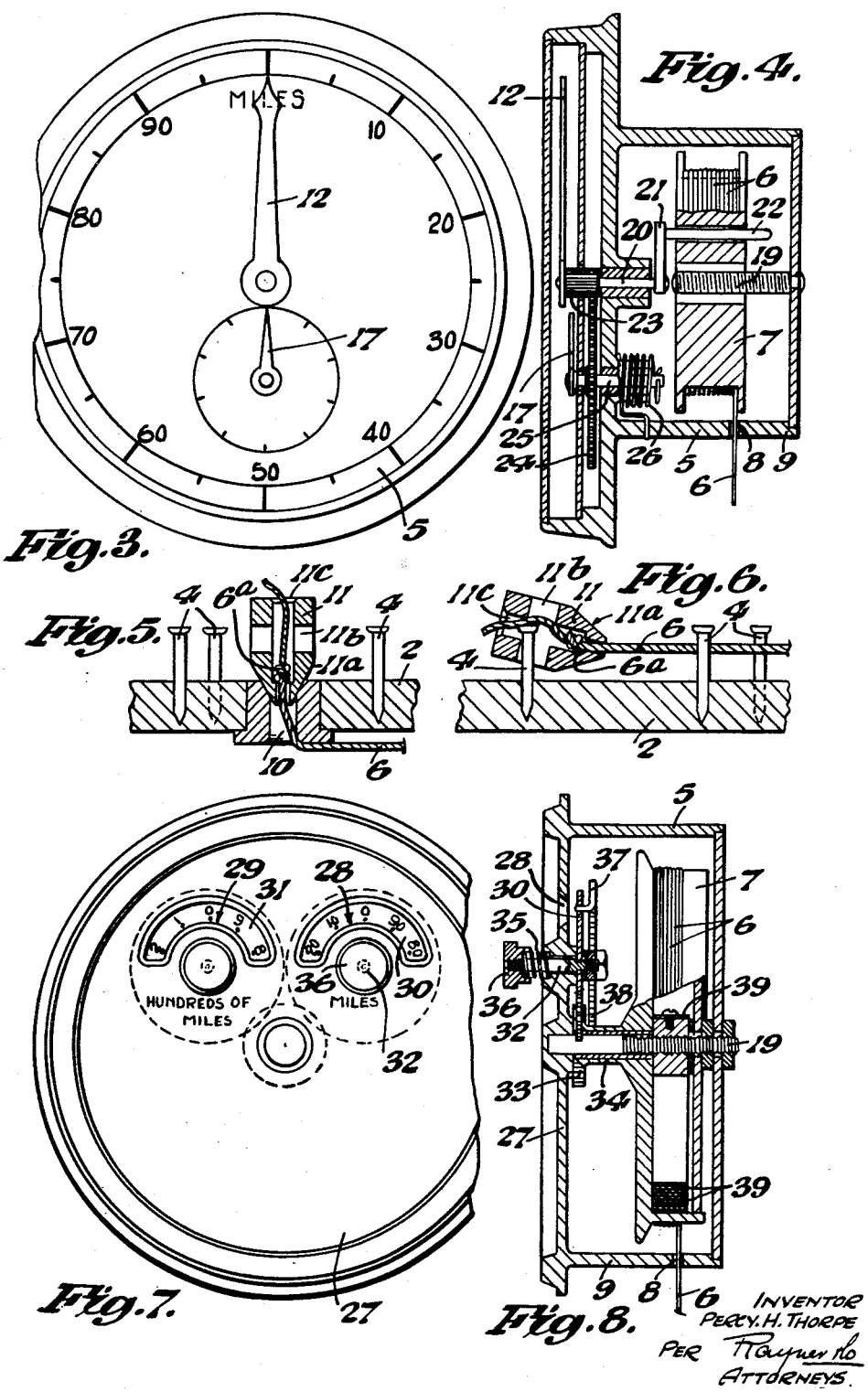

Jan. 24, 1939.   P. H. THORPE   2,144,746
APPARATUS FOR MEASURING DISTANCES AND
INDICATING ROUTES ON MAPS OR CHARTS
Filed Nov. 10, 1937   5 Sheets-Sheet 3

INVENTOR
PERCY. H. THORPE
PER Raynor
ATTORNEYS

Jan. 24, 1939.   P. H. THORPE   2,144,746
APPARATUS FOR MEASURING DISTANCES AND
INDICATING ROUTES ON MAPS OR CHARTS
Filed Nov. 10, 1937   5 Sheets-Sheet 4

INVENTOR
PERCY. H. THORPE
PER
ATTORNEYS

Jan. 24, 1939.

P. H. THORPE 2,144,746

APPARATUS FOR MEASURING DISTANCES AND
INDICATING ROUTES ON MAPS OR CHARTS

Filed Nov. 10, 1937     5 Sheets-Sheet 5

INVENTOR
PERCY H. THORPE
PER Raymento
ATTORNEYS

Patented Jan. 24, 1939

2,144,746

UNITED STATES PATENT OFFICE 2,144,746

APPARATUS FOR MEASURING DISTANCES AND INDICATING ROUTES ON MAPS OR CHARTS

Percy Henry Thorpe, London, England, assignor to Geographia Limited, London, England Application November 10, 1937, Serial No. 173,815
In Great Britain August 11, 1937

7 Claims. (Cl. 33—1)

This invention comprises improvements in and relating to apparatus for measuring distances and indicating routes on maps or charts of a geographical character.

One of the objects of the present invention is to enable any map or chart of a geographical nature to be used for measuring distances and indicating routes from any of a number of centres instead of requiring a specially prepared map or apparatus in connection with each centre, such as a particular town. A further object of the invention is to provide a ready means for adjusting or setting the distance indicating device relatively to a member operatively connected thereto and adapted to be moved from place to place over the map or chart to operate the indicating device.

According to this invention apparatus for measuring distances and indicating routes on maps or charts of a geographical nature comprises a map with a plurality of anchoring elements thereon located at various points and a member adapted to be connected selectively to said anchoring elements and adapted to transmit its movement proportionally to a distance indicating device, and means being provided to enable the indicating device to be set to zero or other desired position relatively to said member without disconnecting said member from the anchoring element with which it is engaged.

In carrying one form of the invention into practice a map or chart of a geographical nature is provided with a plurality of guiding abutments or pegs distributed at suitable places over its surface, and a ligature is connected at one end to a suitable distance indicating device and drawn through an opening in a panel on which the map is mounted and extended to an abutment or peg placed on the map or chart at the place from which it is desired to measure the distance or to indicate a route or routes to any of a number of other places on the map or chart. For this purpose the ligature is drawn out through its opening or guide and is extended to and connected to a selected centre and adjusting means is then operated to set the indicating device to zero, and the ligature is then released and taken around the abutment or peg at the centre and around other abutments or pegs over the route desired to be indicated and is then connected to an abutment or peg at the end of the route. The indicating device will then show the distance from the selected centre over the indicated route to the place or destination at which the end of the ligature is connected. This enables a route to be indicated from any one particular place to any other place instead of from only one particular centre. It also enables the distance over the selected route from a selected centre to any given place to be clearly shown by the indicating device.

Suitable means for adjusting the indicating device may comprise any suitable means for resetting the indicator to zero after the ligature has been connected to the selected centre. One type of means may comprise an adjustable guiding member through which the ligature passes and which is adapted to be moved after the end of the ligature has been connected to the selected centre so as to permit a sufficient length of the ligature to be drawn in by the indicating device, so as to cause it to be reset to zero. Other means for this purpose may be embodied in the indicating device itself and may comprise means to enable the indicating hand or pointer to be adjusted relatively to the ligature or the member to which it is connected, so as to enable the pointer to be reset to zero after the free end of the ligature has been connected to the selected centre. These adjusting means also enable the indicating device to be correctly set to zero so as to compensate for stretch or shrinkage of the ligature or maladjustment of the indicating device.

Where the indicating device is in the form of a clock or dial mechanism, the end of the ligature may be connected to and wound upon a drum by means of a suitable spring, weight or other mechanism. In this case simple means may be provided between the drum and the indicating pointer or dial to enable the indicating device to be reset to zero after the free end of the ligature has been drawn out and connected to the selected centre. In one arrangement a suitable friction or other form of clutch may be interposed between the drum and the pointer or other indicating device so as to permit relative adjustment between them to enable the indicating device to be readily set to zero when the end of the ligature is connected to the selected centre.

In order that this invention may be clearly understood and readily carried into effect five sheets of drawings are appended hereto illustrating embodiments thereof, and wherein:

Figs. 3 and 4 are front and sectional side views respectively of one form of the indicating device.

Figs. 5 and 6 are detail sectional views showing the method of anchoring and guiding the end of the ligature remote from the indicating device.

Figs. 7 and 8 are broken front and sectional side elevation views respectively of a modified form of indicating device.

Figure 1:
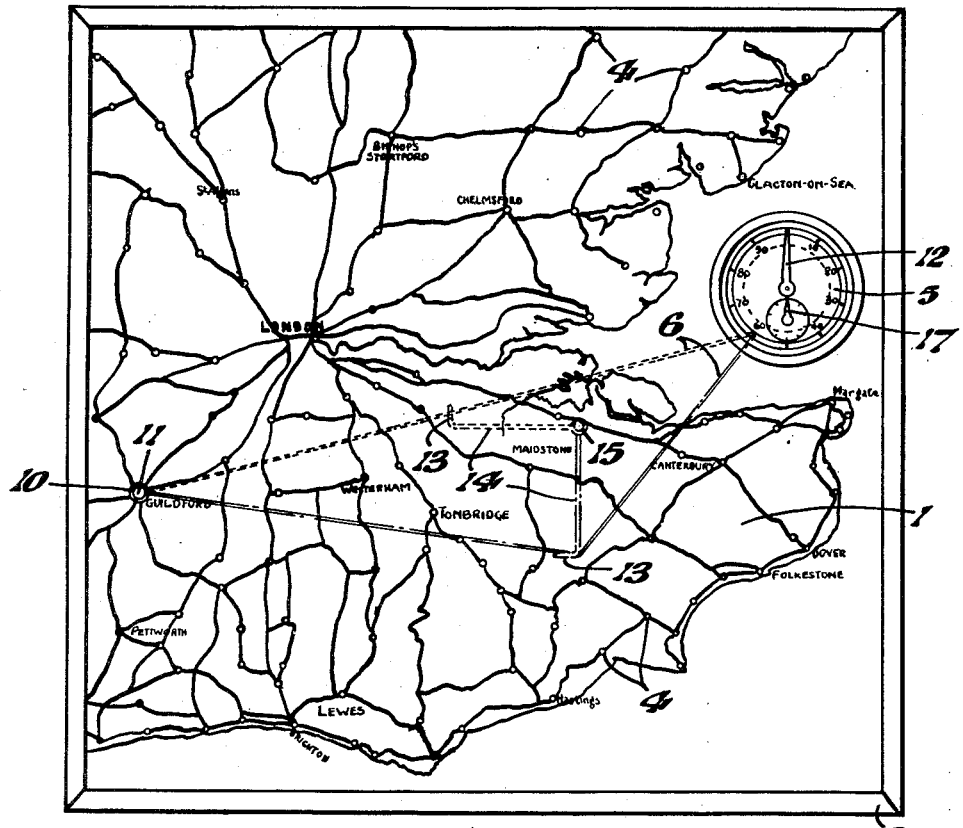
Fig. 1 is a front elevation view of a complete apparatus with a dial type of indicator and a movable guide for the ligature for resetting the indicator to zero.

Referring to the drawings, a suitable map 1 is mounted upon a panel 2 and may be arranged in a suitable frame 3. A multiplicity of abutments or pegs 4 are distributed over the map at various places or towns thereon to serve as anchoring elements for a terminal piece hereinafter described. At a suitable position is mounted the indicating device 5 which, as shown, may be of the dial type. One end of a ligature 6 is connected to a drum 7 (see Fig. 4) with which is associated suitable spring means (hereinafter described) adapted to rotate it about its axis so as to tend to wind the ligature 6 thereon. The free end of the ligature passes through a suitable aperture 8 in the case 9 of the dial indicating device and through an opening or guide 10 in the board or the like 2 on which the map 1 is mounted. The free end of the ligature is provided with a terminal piece 11 of suitable form by which it may be readily held in the fingers. This as shown in Fig. 5 is a short peg with a tapered end 11a to facilitate it seating in the guide 10 and it is also provided with one or more transverse apertures 11b to enable it to be engaged over any of the abutments or pegs 4 distributed over the face of the map. This terminal piece is preferably bored axially as at 11c to enable the appropriate end of the ligature 6 to be threaded therethrough and knotted as at 6a to retain it in the terminal piece.

In using the apparatus the terminal piece 11 at the free end of the ligature 6 is held by the user's fingers and the ligature is drawn through the opening or guide 10 until its terminal piece may be connected by a selected pin 4 to a centre from which it is desired to lay out a route to some other place and to have the distance over this route shown on the distance indicator. The distance indicator 5 is now set to zero by any suitable means such as hereinafter described in various forms, and the terminal piece 11 is then detached from the abutment or peg 4 situated at the selected centre and the ligature is drawn out further and is engaged around or against the abutment or peg at the selected centre and at other places over the route from the centre to the destination, the terminal piece being engaged with a peg situated at the place of destination. The distance indicator will now show the distance between the selected centre and the destination over the selected route which will also be indicated by the ligature. When the ligature is drawn out as described above the spring means with the drum 7 will always tend to re-wind the ligature on the drum, thus keeping it taut.

Figure 2:
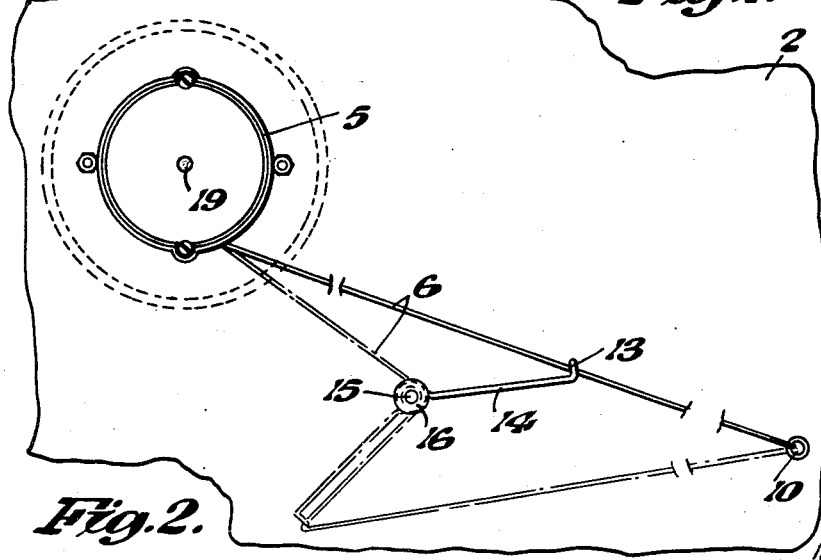
Fig. 2 is a broken detail rear elevation view to a larger scale showing the resetting device employed with the apparatus shown in Fig. 1.

The means for enabling the indicator to be reset to zero relatively to the terminal piece 11 after the terminal piece has been moved away from the aperture 10 and engaged with a peg 4 spaced from the aperture 10 can take the simple form shown in Figs. 1 and 2 which consists of a device which increases the length of unwound ligature drawn from the drum 7 so as to rotate the drum until the pointer 12 reaches the zero position shown in Fig. 3. That is to say the ligature behind the panel is drawn out the distance required to make the pointer 12 complete a full circular movement. For this purpose the ligature 6 is carried through an eye 13 at the free end of an arm 14 pivoted at its other end on a screw 15 which receives a milled nut 16 by which the arm 14 can be held in selected position. If the arm 14 is left loose it will automatically assume the position shown in full lines in Fig. 2 due to the tension of the ligature 6. When the terminal 11 is engaged over the desired peg 4 the desired additional amount of rotation to carry the pointer 12 on to zero can be effected by swinging the arm 14 so as to draw a greater length of ligature from the drum 7, and when the pointer reaches zero the milled nut 16 is tightened against the inner end of the arm 14 and the arm 14 clamped in position. Any subsequent further drawing off of the ligature due to the movement of the terminal piece 11 from peg to peg across the map will now move the pointer 12 from zero through the appropriate amount, so that as regards the pointer 12 it is a simple matter to read at a glance the distance from one place on the map to another. If, as shown, there is combined with the pointer 12 a supplementary pointer 17 moving over a dial 18 to record hundreds of miles or other suitable multiple of measurement, appropriate allowance for change in position of the pointer 17 would be made by the person making the measurement.

The drum 7 is mounted to rotate on a fixed screw 19 so that it moves translatively axially as it rotates at a rate which will ensure the ligature 6 winding and unwinding in a uniform manner to ensure accuracy of measurement. The pointer 12 is carried by a spindle 20 carrying a crank 21 having a pin 22 along which the drum 7 can slide so that the translative axial movements of the drum 7 do not affect the pointer 12. The spindle 20 carries a small pinion 23 meshing with a toothed wheel 24 fixed on a spindle 25 carrying the pointer 17 these two gear wheels having the desired ratio to obtain the necessary relationship in angle of movement of the pointers 12 and 17. The spring means which yieldingly opposes rotation of the drum 7 when pulling off the ligature 6 can be a coiled tension spring 26 on the spindle 25.

Figure 9:
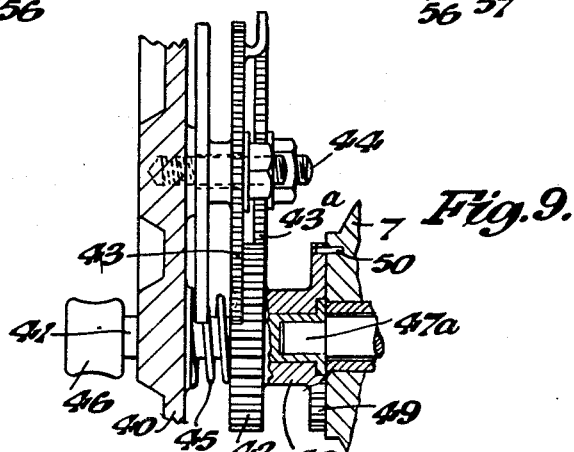
Fig. 9 is a detail sectional side view showing one form of device for disconnecting the drum on which is wound the ligature, from gearing transmitting the rotation of the drum to pointers or graduated discs.

A suitable arrangement by means of which both the units and hundreds indicating dials can be set to zero relatively to the terminal piece 11 is shown in Figs. 7 and 8 in which the indicator casing has a front face 27 which is slotted arcuately at two places 28 and 29 to partially expose two discs 30 and 31, graduated in units and hundreds of miles respectively. The units disc 30 is mounted on a spindle 32 and its periphery is toothed to mesh with a driving pinion 33 formed on a sleeve 34 carrying the drum 7, and the spindle 32 is slidable axially inwards against the influence of a spring 35 to disengage the toothed disc from the driving pinion 33, whereupon the spindle with its disc 30 can be rotated by a knob 36 on the end of the spindle relatively to the drum 7 and the disc 30 reset to indicate zero. The disc 30 can have any suitable means for transmitting movement to the disc 31, e.g. it can carry a finger 37 which once every revolution of the disc 30 engages a tooth of a toothed disc 38 mounted on the spindle of the disc 31. The disc 31 may be free to be set to zero in the same manner as the disc 30 or the driving connection between the discs 30 and 38 as well as normally. In the arrangement shown in Figs. 7 and 8 a clock spring 39 in the drum 7 rewinds the ligature 6 on to the drum. If desired the two dials 30 and 31 or pointers operating over fixed dials, can be reset to zero by the simple operation of momentarily disconnecting the drive from the drum 7 to the discs or pointers. One method of effecting this is shown in Fig. 9 in which the front face 40 of the indicator has a central spindle 41 carrying loosely a gear wheel 42 which meshes with a gear wheel 43 carried by a spindle 44. The spindle 41 is adapted to be slid axially against the influence of a spring 45, a knob 46 being provided on the front end of the spindle to enable this axial sliding to be effected. The inner end of the spindle 41 is centred and supported on a concentric cylindrical boss 47a on the spindle 47 of the drum 7, and the gear wheel 42 on the spindle 41 is formed with a central flanged boss 48, the flanged part of which has a toothed periphery 49 with which is engaged a pin 50 projecting from the hub of the drum 7. The gear wheel 42 is sufficiently thick to maintain contact with the gear wheel 43 when the spindle 42 is pulled outwards to disengage the toothed periphery of the flanged boss 48 from the pin 50, so adjustment of the graduated dials or pointers is simply effected by rotating the knob 46 until the dials or pointers are at zero or other desired indication, and releasing the knob so that the spring 45 re-engages the toothed periphery 49 of the member 48 with the pin 50 on the drum 7. The gear wheel 42 or 43 has a driving engagement with a "hundreds" indicating disc or pointer through a gear wheel 43a.

Figure 10:
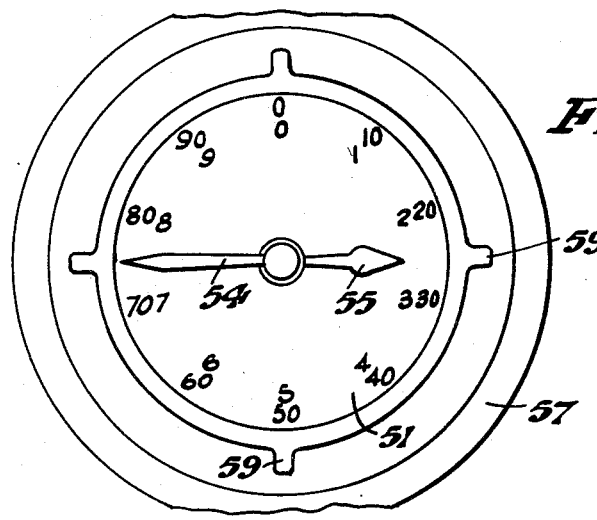
Figs. 10 and 11 are front and cross-sectional views respectively showing a further modification in which the graduated dial of the indicating device is adjustable relatively to pointers movable thereover.
Figure 11:
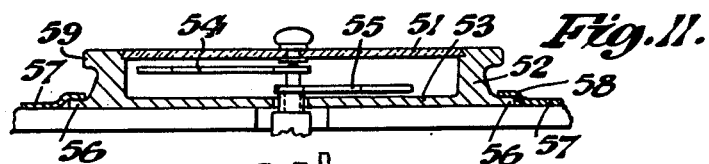

In the further embodiment shown in Figs. 10 and 11 the use of gear disengaging devices to set the indicator to zero or other desired setting is obviated by mounting a graduated front glass 51 in an annular or shallow cylindrical front member 52 having a rear dial 53 which is also suitably graduated, e.g. the glass being graduated in units for a long pointer 54 and the rear dial 53 being graduated in hundreds for a short pointer 55, these two pointers being driven relatively to each other on a common axis from the drum 7 by any suitable gearing, e.g. similarly to an ordinary clock mechanism. The dial carrying member 52 is rotatable by hand relatively to the pointers, and this is conveniently effected by engaging over the flanged periphery 56 of the member 52 a plurality of radial fingers 57, or a single annular ring, secured to the panel 2 and being stepped as at 58 to frictionally grip over the flange 56. The front peripheral part of the member 52 can be provided with short radial fingers 59 to facilitate adjusting it. It will be appreciated that by a simple angular adjustment of the member 52 that the zero index thereon can be brought opposite the pointer 55 without moving the pointers 54 and 55. In addition to this the front glass 51 is adjustable relatively to the member 52 to enable the units graduations to be adjusted relatively to the pointer 54, so that both pointers can be located opposite any desired graduations.

Figure 12:
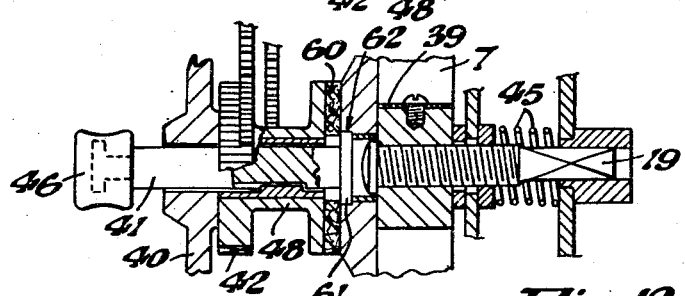
Fig. 12 is a detail sectional elevation view of a simple clutch device for disconnecting the drive from the drum on which the ligature is wound from the pointers or graduated discs.

In Fig. 12 is shown a simple clutch device for temporarily disconnecting the drum 7 from the member 48 carrying the gear wheel 42 similarly to the arrangement shown in Fig. 9 with the exception that the spring 45 in this embodiment yieldingly opposes a slight axial sliding movement of the drum 7 away from a friction disc 60 carried by the opposed flanged end of the member 48. The spindle 41 terminates at its inner end in a flange 61 which engages in an annular seating 62 in the drum 7, so that pressure on the knob 46 frees the gear wheel 42, which is slidably splined on the spindle 41, for rotation to reset the graduated discs or pointers to zero.

Figure 13:
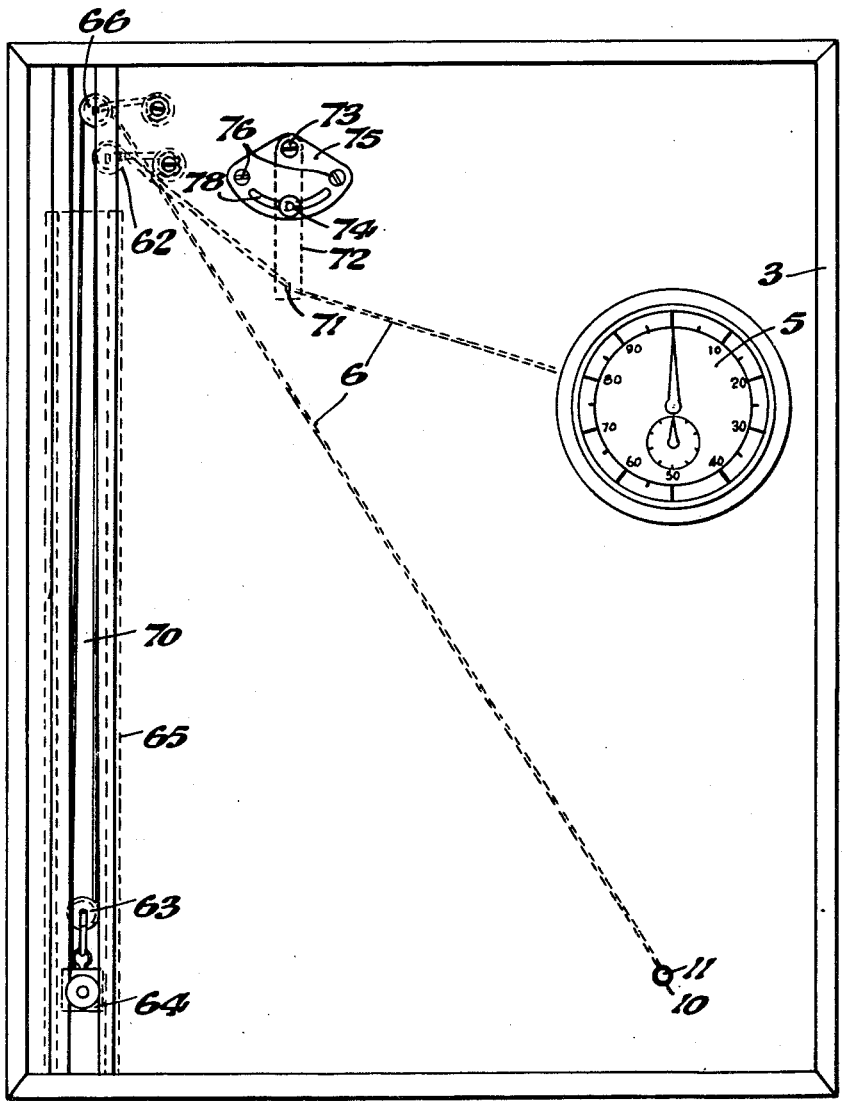
Fig. 13 is a detail broken front elevation view showing a method of using a slidable distance indicator in conjunction with a rotary indicator to enable the terminal piece on the ligature to be adjusted to various starting positions without affecting the rotary indicator.
Figure 14:
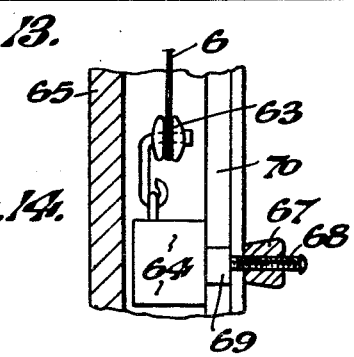
Fig. 14 is a detail sectional side elevation showing the slidable indicator and the means for securing it in selected position.
Figure 15:
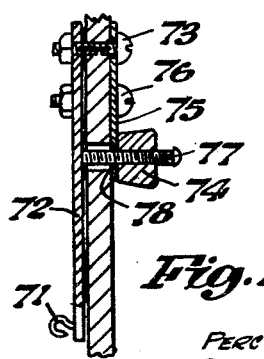
Fig. 15 is a detail sectional side elevation view showing a device for taking up slack in the said ligature.

In the arrangement shown in Figs. 13, 14 and 15 when the ligature 6 is pulled out to engage the terminal element 11 with the desired pin 4 to select a route starting point the indicator 5 is not operated by reason of the ligature 6 being looped for a substantial proportion of its length over a small pulley 62 and under a pulley 63 carried by a vertically slidable block 64 slidable within a channeled cover strip 65 affixed to the back of the panel 2. The ligature is carried up from the pulley 63 of the sliding block and guided over a further pulley 66 from whence it passes to the aperture in the panel. If the sliding block 64 is loose, the spring of the indicator drum 7 will oppose rotation of the drum so long as there is sufficient loop in the ligature over the pulleys 62, 63 and 66 to take up the pull of the free end of the ligature. In practice there is sufficient of such loop and length of movement for the block 64 to enable the terminal piece 11 to be engaged with any pin 4 on the panel without operating the indicator. When the terminal piece is located on the desired pin 4 the block 64 is locked in position. This locking of the block 64 is effected by tightening against the front face of the panel 2 a milled nut 67 threaded on a screw 68 projecting from a boss 69 on the block slidable in a narrow vertical slot 70 in the panel. Should it be necessary to take up any slack in the ligature after the slidable block has been clamped in selected position this can be effected by passing the ligature from the pulley 66 through an eye 71 in the free end of an arm 72 pivoted at its other end to a screw 73 passed through the panel 2, and angularly adjusting such arm to take up the slack, then clamping the arm in its adjusted position. This clamping of the pivoted arm is effected by tightening a nut 74 against a segmental plate 75 secured by screws or bolts 76 to the panel 2. This nut is threaded on a screw 77 carried by the arm 72 and projecting through an arcuate slot 78 in the panel and plate 75.

Figure 16:
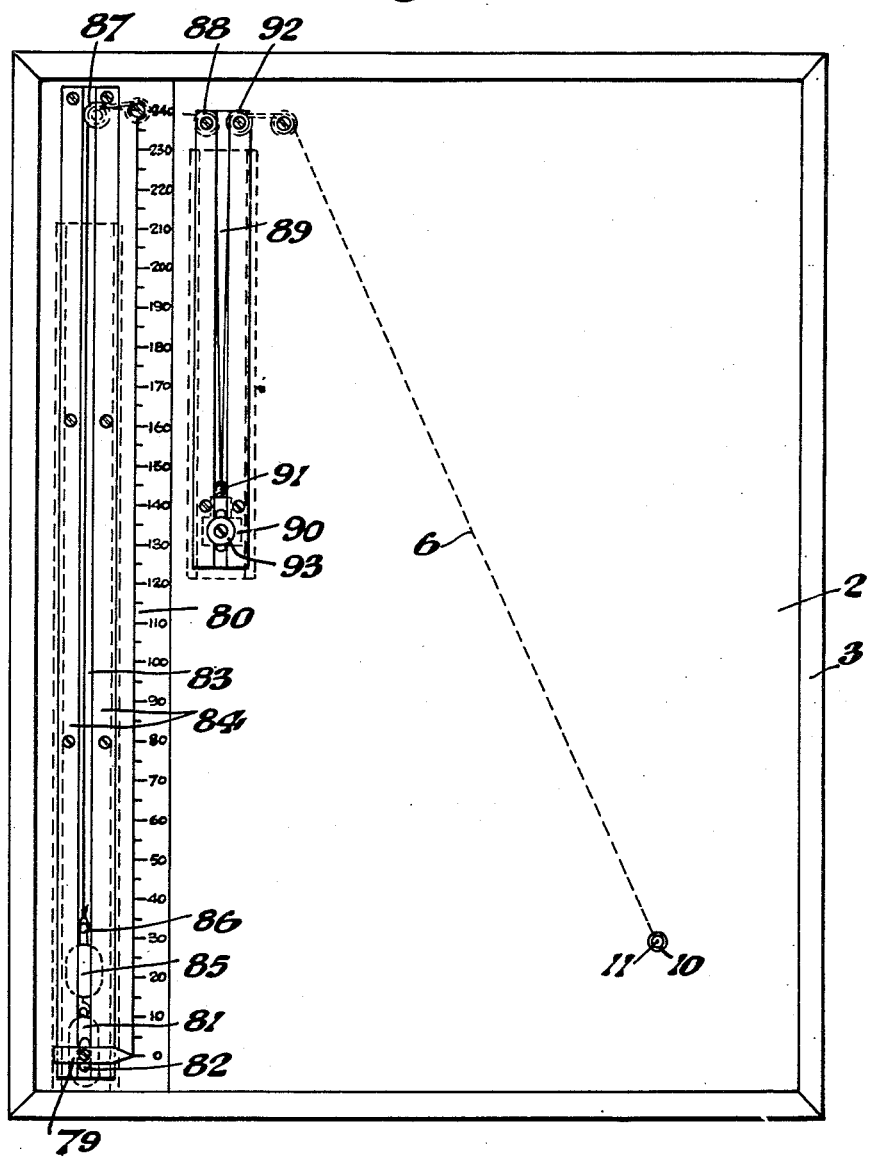
Fig. 16 shows a modification using a sliding indicator.

In the arrangement shown in Fig. 16 the rotary indicator is replaced by a sliding pointer 79, slidable along a vertical graduated scale 80, and connected to a block 81 slidable against the back of the panel 1, this block being formed with a rib 82 to which the pointer is fixed, this rib sliding in a slot 83 bounded by two metal strips 84. This slot with its graduations preferably extends nearly the full height of the panel. The block 81 is suspended by a sliding weight 85 carrying an eye 86 to which is tied one end of the ligature 6. This ligature passes over a pulley 87 at the top of the slot 83 and therefrom over a pulley 88 at the top of another slot 89 in the panel. This slot has slidable therein a weighted block 90 (equivalent to the block 64 in Fig. 13), and a pulley 91 has passed under it the ligature 6 which is carried upwards and over another pulley 92 alongside the pulley 88, from whence the ligature passes to the terminal piece 11. The weighted block 90 is appreciably lighter than the indicator block 85, and consequently when the ligature 6 is pulled through the hole 10 in order to anchor the terminal piece 6 to the desired pin, the block 90 will slide along its slot, and when the terminal piece is anchored to the desired starting point, the block 90 can be locked against the panel by means of a nut 93 functioning in the same manner as the nut 67 in Fig. 14. Any subsequent movement of the terminal piece will now be transferred to the sliding pointer 79.

With maps or charts arranged according to the present invention and provided with indicating means of the type described, it is possible with any one map to measure the distance from any selected centre to any of the surrounding places or towns over a selected route. The route between the places or towns will be clearly shown by the ligature and the distance covered by this particular route between the two places or towns will be shown on the indicator.

I claim:—

1. Apparatus for measuring distances and giving a visual indication of circuitous routes plotted on maps or geographical charts, comprising a map bearing panel, a flexible cord-like member, a plurality of permanent anchoring elements projecting upwardly from a plurality of place markings on the map, and affording abutments against which the cord-like member can be stretched and bent to indicate an approximate route, a terminal member attached to one end of said cord-like member and adapted to be selectively anchored to said anchoring elements, a distance indicating device to which said cord-like member is connected for transmitting the movements of said terminal member to said indicating device to vary the measurement indicated on the indicating device, and a relatively movably adjustable member associated with the indicating device and cord-like member and adapted to set the indicating device to zero or other desired position relatively to said terminal member without disconnecting said terminal member from the anchoring element with which it is engaged.

2. Apparatus for measuring distances and giving a visual indication of circuitous routes plotted on maps or charts of a geographical nature comprising a map bearing panel, a distance indicating device on the panel, a flexible cord-like member operatively connected at one end to means to operate the indicating device by tension applied to the cord-like member, a terminal piece at the other end of the cord-like member, an aperture in the panel indicating a selected route origin point on the map and through which said cord-like member is passed, a plurality of pins projecting up from a plurality of place marks on the map, said terminal piece being adapted to be selectively anchored to said pins and the said cord-like member to be drawn taut and bent over said projections to indicate an approximate route, weighted means maintaining the cord-like member under tension, and means for setting said indicating device to zero or other desired position relatively to said terminal piece.

3. Apparatus for measuring distances and giving a visual indication of circuitous routes on maps or charts of a geographical nature comprising a map bearing panel, a distance indicating device on the panel, a flexible cord-like member operatively connected at one end to means to operate the indicating device by tension applied to the cord-like member, a terminal piece at the other end of the cord-like member, an aperture in the panel indicating a selected route origin point on the map and through which said cord-like member is passed, a plurality of pins projecting up from a plurality of place members on the map, said terminal piece being adapted to be selectively anchored to said pins and the said cord-like member to be drawn taut and bent over said projections to indicate an approximate route, weighted means maintaining the cord-like member under tension, and an adjustable guide for said cord-like member on the rear of said panel adjustable to vary the length of cord-like member drawn from the indicating device to operate the indicating device relatively to the anchored terminal piece.

4. Apparatus for measuring distances and giving a visual indication of circuitous routes on maps or charts of a geographical nature comprising a map bearing panel, a distance indicating device on the panel, a flexible cord-like member operatively connected at one end to means to operate the indicating device by tension applied to the cord-like member, a terminal piece at the other end of the cord-like member, an aperture in the panel indicating a selected route origin point on the map and through which said cord-like member is passed, a plurality of pin-like members projecting up from a plurality of place marks on the map, said terminal piece being adapted to be selectively anchored to said pin-like members and the cord-like member to be drawn taut and bent over said pin-like members to indicate an approximate route, weighted means maintaining the cord-like member under tension, an angularly adjustable arm pivoted to the rear of the panel, a guide for the cord-like member on said arm spaced from the pivot of the arm and means for locking the arm in selected position.

5. Apparatus for measuring distances and giving a visual indication of circuitous routes on maps or charts of a geographical nature comprising a map bearing panel, a distance indicating device on the panel, a flexible cord-like member operatively connected at one end to means to operate the indicating device by tension applied to the cord-like member, a terminal piece at the other end of the cord-like member, an aperture in the panel indicating a selected route origin point on the map and through which said cord like member is passed, a plurality of pin-like members projecting from a plurality of place marks on the map, said terminal piece being adapted to be selectively anchored to said pin-like members, weighted means maintaining the cord-like member under tension, a pair of spaced guides on the rear of the panel, a slidably guided support for one of said guides, and means to fixedly secure the said slidable support relatively to the panel, said cord-like member being formed with a loop between its ends by being passed over said guides.

6. Apparatus for measuring distances and giving a visual indication of circuitous routes on maps or charts of a geographical nature comprising a map bearing panel, a distance indicating device on the panel, a flexible cord-like member operatively connected at one end to means to operate the indicating device by tension applied to the cord-like member, a terminal piece at the other end of the cord-like member, an aperture in the panel indicating a selected route origin point on the map and through which said cord-like member is passed, a plurality of pins projecting up from a plurality of place marks on the map, said terminal piece being adapted to be selectively anchored to said pins, weighted means maintaining the cord-like member under tension, a pair of spaced guides on the rear of the panel, a slidably guided support for one of said guides, means to fixedly secure the said slidable support relatively to the panel, said cord-like member being formed with a loop between its ends by being passed over said guides, an additional guide on said panel for the cord-like member, means to change the position of the guide to take up slack in the cord-like member and means to secure said additional guide in selected position.

7. Apparatus for measuring distances and giving a visual indication of circuitous routes on maps or geographical charts, comprising a map bearing panel, a plurality of anchoring elements fixed thereon at various points, a terminal member adapted to be selectively anchored to said anchoring elements, a graduated guide, a weighted indicating member slidable along said guide, a cord-like member connecting said terminal member to said weighted slidable indicating member, guides over which said cord-like member is carried from the terminal member to the indicating member, a resetting device comprising a translatively movable member carrying one of said guides and located so as to form a bend or loop in the cord-like member between its ends, and means to lock said translatively movable member in position when the terminal member is engaged with a selected anchoring member.

PERCY HENRY THORPE.